(12) United States Patent
Juhlin

(10) Patent No.: US 8,947,843 B2
(45) Date of Patent: Feb. 3, 2015

(54) FAST BREAKER FAILURE DETECTION FOR HVDC CIRCUIT BREAKERS

(75) Inventor: Lars-Erik Juhlin, Ludvika (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/007,926

(22) PCT Filed: Apr. 4, 2011

(86) PCT No.: PCT/EP2011/055207
§ 371 (c)(1),
(2), (4) Date: Oct. 4, 2013

(87) PCT Pub. No.: WO2012/136244
PCT Pub. Date: Oct. 11, 2012

(65) Prior Publication Data
US 2014/0055903 A1    Feb. 27, 2014

(51) Int. Cl.
| | |
|---|---|
| H01H 73/00 | (2006.01) |
| H02H 3/20 | (2006.01) |
| H02H 9/04 | (2006.01) |
| H01H 71/00 | (2006.01) |
| H02H 7/22 | (2006.01) |

(Continued)

(52) U.S. Cl.
CPC .............. *H01H 71/00* (2013.01); *H02H 7/222* (2013.01); *H02H 3/087* (2013.01); *H02H 7/268* (2013.01)
USPC ......................................... 361/115; 361/93.1

(58) Field of Classification Search
CPC ................ H01H 33/596; H01H 83/08; H01H 2009/543; H02H 7/268
USPC ........................................ 361/115, 93.1, 93.2
See application file for complete search history.

(56) References Cited

U.S. PATENT DOCUMENTS

| | | | | |
|---|---|---|---|---|
| 3,777,215 | A | 12/1973 | D'Esopo | |
| 4,300,181 | A * | 11/1981 | Premerlani | ....................... 361/4 |

(Continued)

FOREIGN PATENT DOCUMENTS

| | | |
|---|---|---|
| EP | 0867998 A1 | 9/1998 |
| GB | 1473837 | 5/1977 |

(Continued)

OTHER PUBLICATIONS

Translation of JP 08-148067. Jun. 7, 1996.*

*Primary Examiner* — Rexford Barnie
*Assistant Examiner* — Christopher Clark
(74) *Attorney, Agent, or Firm* — Birch, Stewart, Kolasch & Birch, LLP

(57) ABSTRACT

A breaker failure detection device for a direct current (DC) circuit breaker (200) is provided. The circuit breaker comprises a circuit breaking element (204) and a non-linear resistor, e.g., a surge arrester (205), connected in parallel. The breaker failure detection device comprises a current sensor (212, 213, 214, 215), for measuring a current commutating from the circuit breaking element (204), and a breaker failure detection unit (211). The breaker failure detection unit (211) is arranged for comparing the measured current to desired values and deciding that an internal commutation process of the circuit breaker (200) does not proceed as desired if the measured current deviates from the desired values. The present invention makes use of an understanding that an improved detection of breaker failures may be achieved by monitoring the internal commutation process of the circuit breaker. Further, a method of breaker failure detection is provided.

21 Claims, 2 Drawing Sheets

(51) Int. Cl.
*H02H 3/087* (2006.01)
*H02H 7/26* (2006.01)

(56) References Cited

U.S. PATENT DOCUMENTS

| | | | | |
|---|---|---|---|---|
| 4,908,756 A | * | 3/1990 | Higashino | 363/58 |
| 5,214,557 A | * | 5/1993 | Hasegawa et al. | 361/4 |
| 5,402,297 A | * | 3/1995 | Ouchi et al. | 361/4 |
| 5,452,170 A | * | 9/1995 | Ohde et al. | 361/13 |
| 7,813,090 B2 | * | 10/2010 | Suzuki et al. | 361/35 |
| 2011/0235375 A1 | | 9/2011 | Dommaschk et al. | |
| 2013/0038975 A1 | * | 2/2013 | Hafner et al. | 361/93.9 |

FOREIGN PATENT DOCUMENTS

| | | | | |
|---|---|---|---|---|
| JP | 08148067 A | * | 6/1996 | H01H 33/59 |
| WO | WO 2010/025758 A1 | | 3/2010 | |

* cited by examiner

FAST BREAKER FAILURE DETECTION FOR HVDC CIRCUIT BREAKERS

FIELD OF THE INVENTION

The invention relates in general to high voltage direct current (HVDC) power transmission, and more specifically to breaker failure detection for direct current (DC) circuit breakers.

BACKGROUND OF THE INVENTION

HVDC power transmission is becoming increasingly important due to the steadily rising need for bulk power delivery and interconnected power transmission and distribution systems.

An HVDC grid typically comprises multiple alternating current (AC)/DC converter terminals interconnected by transmission lines, i.e., underground cables and/or overhead lines. Within the grid, a terminal may be connected to multiple terminals resulting in different types of topologies. Such a multiple terminal grid enables efficient congestion management and has an improved stability against disturbances.

DC circuit breakers are commonly used for isolating faulty components, such as transmission lines, in HVDC grids. Due to the low inductance of DC transmission lines, as compared to AC systems, HVDC systems suffer from a high rate of rise of fault induced currents. Thus, the DC breakers have to interrupt the current quickly, before the interrupting capability of the breakers is exceeded. In particular, in the event of a breaker failure, i.e., if a circuit breaker fails to interrupt the current, a backup circuit breaker has to be tripped before the rising current exceeds the interrupting capacity of the backup breaker. Thus, unless very large inductances are used for limiting the rate of increase of fault induced currents, a fast detection of DC circuit breaker failures is desirable.

Known breaker failure detection techniques are based on measuring the total current through the DC circuit breaker, and checking whether the total current decreases to zero within a given time interval, starting after the reception of a trip signal. However, the decay of the current is dictated by the non-linear resistor, e.g., a surge arrester, which is typically employed for extinguishing the current, resulting in rather long time intervals. Furthermore, since the current decay is dependent on various external parameters, such as the load prior to the fault, the location of the fault, and the total inductance of the involved circuits, a safety margin has to be taken into account, resulting in even longer time intervals.

SUMMARY OF THE INVENTION

It is an object of the present invention to provide a more efficient alternative to the above techniques and prior art.

More specifically, it is an object of the present invention to provide an improved breaker failure detection for DC circuit breakers, in particular HVDC circuit breakers.

These and other objects of the present invention are achieved by means of a breaker failure detection device having the features defined in independent claim 1, and by means of a method of breaker failure detection defined in independent claim 9. Embodiments of the invention are characterized by the dependent claims.

According to a first aspect of the invention, a breaker failure detection device for a DC circuit breaker is provided. The DC circuit breaker comprises a circuit breaking element and a non-linear resistor. The circuit breaking element is arranged for interrupting a DC circuit upon reception of a trip signal. The circuit breaking element may, e.g., be based on a mechanical breaker or a solid-state breaker. The circuit breaking element may also be a hybrid circuit breaking element comprising different types of breakers. The non-linear resistor is connected in parallel with the circuit breaking element. The breaker failure detection device comprises at least one current sensor and a breaker failure detection unit. The current sensor is arranged for measuring a current commutating from the circuit breaking element. Optionally, the breaker failure detection device may comprise a plurality of current sensors, and the breaker failure detection unit may be arranged for measuring the current commutating from the circuit breaking element at different locations within the DC circuit breaker. The breaker failure detection unit is arranged for comparing the measured current to desired values. The breaker failure detection unit is further arranged for deciding that an internal commutation process of the circuit breaker does not proceed as desired if the measured current deviates from the desired values.

According to a second aspect of the invention, a method of breaker failure detection for a DC circuit breaker is provided. The DC circuit breaker comprises a circuit breaking element and a non-linear resistor. The circuit breaking element is arranged for interrupting a DC circuit upon reception of a trip signal. The non-linear resistor is connected in parallel with the circuit breaking element. The method comprises measuring a current commutating from the circuit breaking element and comparing the measured current to desired values. Optionally, the current commutating from the circuit breaking element may be measured at different locations within the DC circuit breaker. The method further comprises deciding that an internal commutation process of the circuit breaker does not proceed as desired if the measured current deviates from the desired values.

The present invention makes use of an understanding that an improved detection of breaker failures in DC circuit breakers may be achieved by monitoring the internal commutation process of the circuit breaker. The internal commutation process sets in when the circuit breaking element starts to interrupt the current through the DC circuit of the circuit breaker. Typically, the interruption process is initiated in response to receiving a trip signal from an external control unit of the switchyard, or the power distribution system, in which the circuit breaker is arranged. The trip signal may also originate from a failure protection device monitoring a transmission line to which the circuit breaker is connected.

When the current breaking element starts interrupting the current, the current is commutated to the non-linear resistor connected in parallel with the circuit breaking element. The non-linear resistor, which may, e.g., be a surge arrester, provides a gradually increasing counter voltage for extinguishing the current and dissipates the magnetic energy stored in the circuit. Optionally, if a resonance circuit is connected in parallel with the circuit breaking element, the current is initially commutated to the resonance circuit, and in particular to the capacitor comprised in the resonance circuit, resulting in a reasonable transient recovery voltage over the circuit breaking element at current extinction. More specifically, the capacitor is first charged by the direct current. Subsequently, when the voltage over the capacitor reaches the protective level of the non-linear resistor, the current is commutated to the non-linear resistor.

To this end, the internal commutation of the current from the current breaking element to the non-linear resistor, and, optionally, via the resonance circuit as an intermediate step, is monitored in order to assess whether the circuit breaker succeeds in interrupting the current. In other words, the commutating current is measured in order to verify that the internal commutation process proceeds as desired, i.e., in accordance with the design of the circuit breaker. This is achieved by comparing the measured current, or the measured currents, if a plurality of current sensors is employed, to desired values which are representative of a successful commutation process in a circuit breaker under normal operation, i.e., in absence of a breaker failure. Such desired values may, e.g., be deduced from a simulation of a commutation process or by experiment.

Since the current through the circuit breaking element is extinguished much faster than the total current through the circuit breaker, the decay of the latter being dictated by the gradually increasing counter voltage of the non-linear resistor, breaker failures may be detected in shorter time than what is known in the art. Furthermore, since the decay time for the current through the circuit breaking element, i.e., the time it takes for the current through the circuit breaking element to decrease to zero, is not dependent on external inductances, a safety margin is not required.

An embodiment of the invention is advantageous in that protective measures may be taken as soon as it is detected that the internal commutation process does not proceed as expected. Thereby, an embodiment of the invention facilitates a faster breaker failure detection than known failure detection techniques based on measuring the total direct current through the circuit breaker and deciding that the circuit breaker has failed if a non-zero current is detected after a predetermined time interval has lapsed, which time interval starts from the reception of a trip signal and is sufficiently long to allow the circuit breaker to complete its breaking action, including the extinction of the magnetic energy stored in the circuit by the non-linear resistor.

The detection of breaker failures may be improved by measuring the current commutating from the circuit breaking element at several locations within the circuit of the DC circuit breaker, and taking the different measurements into account when assessing whether a breaker failure has occurred. In this way, a more reliable breaker failure detection may be achieved. For this purpose, the breaker failure detection unit may comprise a plurality of current sensors.

According to an embodiment of the invention, the breaker failure detection unit is further arranged for deciding, under the condition that the measured current deviates from the desired values, that the circuit breaking element has failed in interrupting the DC circuit. Establishing, based on monitoring the internal commutation process of the circuit breaker, that the circuit breaking element has failed in interrupting the DC circuit is advantageous in that protective measures may be taken earlier than what is known in the art.

According to an embodiment of the invention, the breaker failure detection unit is further arranged for tripping, in response to deciding that the internal commutation process does not proceed as desired, one or more backup circuit breakers. An early tripping of a backup circuit breaker, as a protective measure, when the internal commutation process does not proceed as desired, is advantageous since the backup circuit breaker may attempt to break the current before the quickly rising fault induced current exceeds the interrupting capability of the backup circuit breaker. The backup circuit breaker may be an adjacent, in terms of the electric circuit, circuit breaker, or a redundant circuit breaker section in case the DC circuit breaker comprises a plurality of circuit breaker sections which are arranged such that redundancy is provided.

According to an embodiment of the invention, the breaker failure detection unit is further arranged for re-closing, in response to deciding that the internal commutation process does not proceed as desired, the circuit breaking element. This is advantageous in that the risk of damaging parts of the circuit breaker, such as the circuit breaking element, is reduced. In particular, an arc across open contacts of a mechanical breaker prevailing for a too long time may be avoided.

According to an embodiment of the invention, the breaker failure detection unit is further arranged for estimating the amount of energy to be dissipated by the non-linear resistor, comparing the estimated energy to a predetermined value, and deciding that the non-linear resistor is overloaded if the estimated energy exceeds the predetermined value. The estimation of the amount of energy is based on the measured current and the counter voltage of the non-linear resistor. To this end, the energy to be dissipated by the non-linear resistor, which energy amounts to the current which is commutated from the circuit breaking element to the non-linear resistor, is estimated by a thermal model and compared to a threshold value. The threshold value which is used for comparison may, e.g., be a value equal, or close to, the rating of the non-linear resistor. Estimating the amount of energy to be dissipated by the non-linear resistor is advantageous in that protective measures may be taken, in order to reduce the risk of damaging the non-linear resistor, when the amount of current commutated to the non-linear resistor appears to exceed the energy dissipating capabilities of the non-linear resistor. The estimation may be performed before the commutation process is completed, and in particular before the non-linear resistor is overloaded.

According to an embodiment of the invention, the breaker failure detection unit is further arranged for re-closing the circuit breaking element in response to deciding that the non-linear resistor is overloaded. This is advantageous in that the stress on the non-linear resistor, and, consequently, the risk of damaging the non-linear resistor, is reduced. Further, back-up circuit breakers may be tripped in addition to re-closing the circuit breaking element.

According to an embodiment of the invention, a DC circuit breaker is provided. The circuit breaker comprises a circuit breaking element, a non-linear resistor, and a breaker failure detection device. The circuit breaking element is arranged for interrupting a DC circuit upon reception of a trip signal. The non-linear resistor is connected in parallel with the circuit breaking element. Providing a DC circuit breaker with a breaker failure detection device according to an embodiment of the invention is advantageous in that a breaker failure occurring at the circuit breaker may be detected quickly and protective measures, as described hereinbefore, may be taken as soon as the breaker failure detection unit has revealed the failure.

According to an embodiment of the invention, the circuit breaker further comprises a resonance circuit which is connected in parallel with the circuit breaking element. The resonance circuit typically comprises a capacitor and an inductor connecter in series. However, if the circuit breaking element is based on a solid-state, i.e., semiconductor based, circuit breaking element, no resonance circuit is needed.

Even though embodiments of the present invention, and advantages thereof, have in some cases been described with reference to the breaker failure detection device according to the first aspect of the invention, corresponding reasoning applies to embodiments of the method according to the second aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
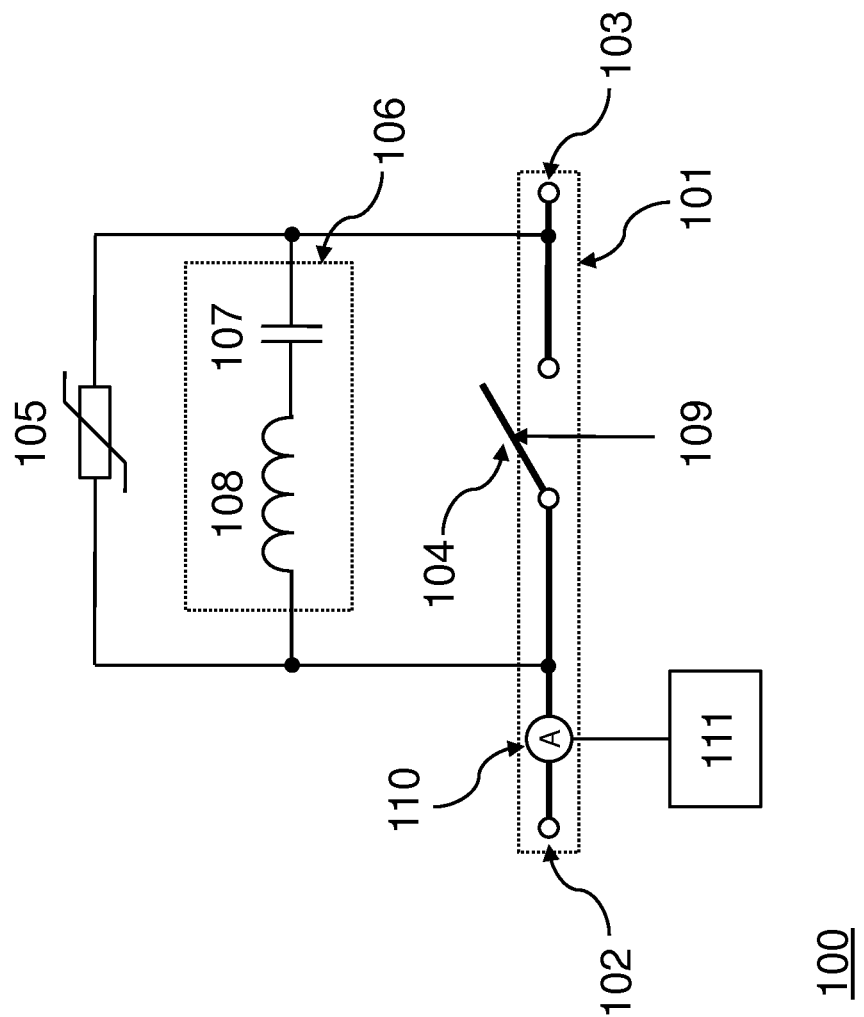
FIG. 1 shows a DC circuit breaker with known breaker failure detection functionality.

In FIG. 1, a DC circuit breaker, having breaker failure detection functionality in accordance with what is known in the art, is shown. Circuit breaker 100 comprises a DC circuit 101 for carrying a direct current between terminals 102 and 103, a circuit breaking element 104 for breaking the direct current carried by circuit 101, a non-linear resistor 105 with suitable characteristics, connected in parallel with circuit breaking element 104, and a resonance circuit 106 connected in parallel with circuit breaking element 104 and non-linear resistor 105. Non-linear resistor 105 may, e.g., be a surge arrester. Circuit breaking element 104, also referred to as interrupter, may, e.g., be a mechanical interrupter or a solid-state interrupter based on semiconductor devices. Resonance circuit 106 typically comprises a capacitor 107 and, optionally, an inductance 108, which may be a physical reactor or the inherent circuit inductance. If circuit breaking element 104 is solid-state based, resonance circuit 106 is typically omitted.

During normal operation interrupter 104 is closed. Upon reception of a trip signal 109, received, e.g., from an external control unit or a protective unit of an HVDC power transmission system into which circuit breaker 100 is incorporated, interrupter 104 attempts to interrupt the current carried by DC circuit 101. As a consequence of interrupter 104 effecting its breaking action, the direct current is commutated via resonance circuit 106 to surge arrester 105. More specifically, capacitor 107 will start charging and the voltage across capacitor 107 will increase. Once the voltage has reached the counter voltage, also referred to as clamping voltage, of surge arrester 105, the latter will change to a conducting state. Consequently, the direct current will start to decrease and the energy stored in the DC circuit, including any transmission lines connected to circuit breaker 100, will be dissipated by surge arrester 105.

DC circuit breaker 100 further comprises a current sensor 110, for measuring a direct current which is carried by DC circuit 101, and a breaker failure detection unit 111, for detecting a breaker failure of circuit breaker 100. Breaker failure detection unit 111 is arranged for verifying that the current through the circuit breaker, i.e., through DC circuit 101, has decreased to zero after a predetermined time interval, which starts in response to receiving trip signal 109 ordering the circuit breaker to interrupt the current, has lapsed. The time interval is chosen such that DC circuit breaker 100 manages to extinguish the current if no breaker failure occurs, taken into account possible fault locations and possible circuit configurations.

The known approach of breaker failure detection described hereinbefore has the drawback that the assessment, whether a breaker failure has occurred, can only be made after the predetermined time interval has lapsed. Since the current through circuit breaker 100 decreases to zero first after surge arrester 105 has extinguished the current, the time interval is rather long. As a consequence, there is a risk that protective measures, such as tripping a backup circuit breaker, are taken too late, and that the fault induced current has risen to a value which exceeds the breaking capability of the backup circuit breaker.

Figure 2:
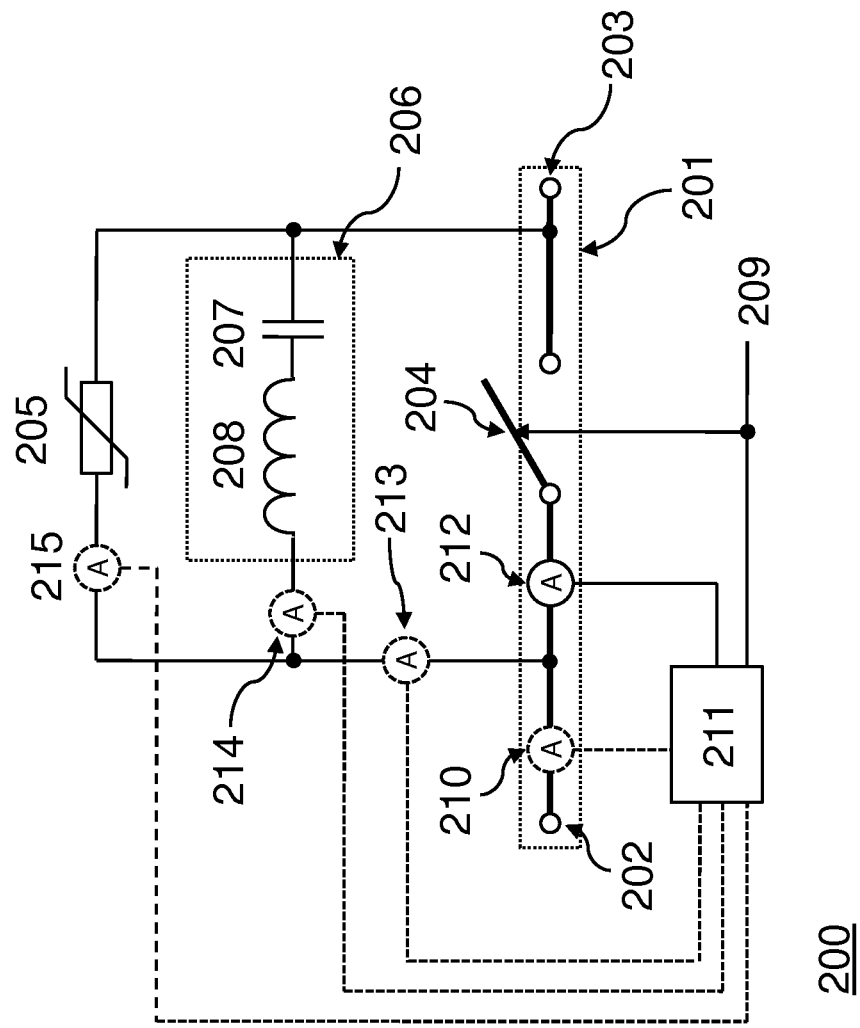
FIG. 2 shows a DC circuit breaker according to an embodiment of the invention.

With reference to FIG. 2, an embodiment of the invention is described. DC circuit breaker 200, shown in FIG. 2, is similar to DC circuit breaker 100, described with reference to FIG. 1, but has an improved breaker failure detection functionality. More specifically, circuit breaker 200 comprises a DC circuit 201 for carrying a direct current between terminals 202 and 203, a circuit breaking element 204 for breaking the direct current carried by circuit 201, a non-linear resistor 205 with suitable characteristics, connected in parallel with circuit breaking element 204, and a resonance circuit 206 connected in parallel with circuit breaking element 204 and non-linear resistor 205. Non-linear resistor 205 may, e.g., be a surge arrester. Circuit breaking element 204 may, e.g., be a mechanical interrupter or a solid-state interrupter based on semiconductor devices. Resonance circuit 206 typically comprises a capacitor 207 and, optionally, an inductance 208, which may be a physical reactor or the inherent circuit inductance. If circuit breaking element 204 is solid-state based, resonance circuit 206 may be omitted.

Circuit breaker 200 further comprises a current sensor 212 and a breaker failure detection unit 211. In contrast to circuit breaker 100, described with reference to FIG. 1, current sensor 212 is arranged for measuring the current carried by DC circuit 201 at a location within the electrical circuit of circuit breaker 200, and in particular within circuit breaking element 204, thereby making it possible to not only measure the direct current passing the circuit breaker via DC circuit 201, as is the case for current sensor 110 of circuit breaker 100, but also to measure the current which is internally commutated from circuit breaking element 204 to surge arrester 205 and, if present, to resonance circuit 206. Thus, by measuring the current at a location within the electrical circuit of circuit breaker 200, an internal current commutation can be monitored. The monitoring is effected by breaker failure detection unit 211 which is arranged for reading the current measurements from current sensor 212, and comparing the measured values to desired values. Breaker failure detection unit 211 is further arranged for assessing whether a breaker failure has occurred. To this end, an unsuccessful internal commutation is interpreted as being indicative of a breaker failure. In response to deciding that the internal commutation process has failed, breaker failure detection unit 211 is further arranged for taking protective measures, such as tripping backup circuit breakers and/or re-closing circuit breaking element 204.

Breaker failure detection unit 211 may further be arranged for assessing, based on the behavior of the measured current as a function of time, the cause of the failing internal commutation, i.e., to identify the failing part of circuit breaker 200. For instance, the absence of a current commutating from current breaking element 204 may indicate that circuit breaking element 204 has failed. On the other hand, a commutating current which does not decrease with time as expected may be indicative of a failing surge arrester 205. This may, e.g., be the case if surge arrester 205 fails to setup a counter voltage.

Further with reference to FIG. 2, alternative locations for measuring the current commutating from circuit breaking element 204 are described. For instance, instead of utilizing current measurements from current sensor 212, breaker failure detection according to an embodiment of the invention may be performed based on current measurements performed by current sensors 213, 214, or 215.

In order to improve the detection of breaker failures, more than one current sensor may be used for measuring the current at different locations within circuit breaker 200, as was described above. Further, current sensor 210 may be also be utilized. In this case, failure detection unit 211 may be arranged for assessing whether a breaker failure has occurred based on current measurements obtained from several current sensors. This is advantageous in that a more reliable detection of a breaker failure may be achieved. Further, the underlying cause of the detected failure of the internal commutation process may be deduced more reliably. In addition, current sensors 214 and 215 may be used to separately determine the amount of current which is commutated to surge arrester 205 and resonance circuit 206, respectively. In this way an imminent overload of surge arrester 205, or resonance circuit 206, may be detected, based, e.g., on a thermal model, and protective measures may be taken.

For instance, an embodiment of the invention, such as DC circuit breaker 200 described with reference to FIG. 2, may be arranged for estimating the amount of thermal energy to be dissipated by surge arrester 205. This may, e.g., be accomplished by calculating the electrical energy associated with the current which is commutated to surge arrester 205. More specifically, since the electrical energy $E_{el}$ may be calculated as $E_{el}=\int V(t)I(t)dt$, an estimate for the energy to be dissipated by surge arrester 205 may be obtained from $E_{el}=V_0 \int I(t)dt$, where $V_0$ is the counter voltage of surge arrester 205 and $I(t)$ is the time-dependent current measured by current sensor 214, as was described hereinbefore. Using a model for the time dependence of the current, an estimate of the energy may be obtained after the commutation process has set in, but before the commutation process is completed, by extrapolating the time-dependent current and integrating it over the entire commutation process. An estimate of the energy to be dissipated may also be based on current measurements obtained from any other current sensor than current sensor 214. The estimated energy is then compared with a predetermined value, based on which comparison it can be decided whether or not the non-linear resistor 205 is likely to be overloaded or not. That is, if the estimated energy to be dissipated by the non-linear resistor 205 exceeds the predetermined value, the non-linear resistor 205 is overloaded.

It will also be appreciated that certain combinations of current sensors may be utilized which allow to derive currents at locations within circuit breaker 200 where no measurements are performed. For instance, if current sensors 210 and 213 are utilized, the current at location 212 may be deduced from the difference of the currents measured at 210 and 213, respectively, and the current at 215 is equal to the current measured at 213. Further, if current sensors 210, 214, and 215, are used, the current at 212 may be calculated from the current measured at 210 minus the current measured at 214 minus the current measured at 215.

Depending on the respective location of the current sensors, different types of current sensors may be utilized. Preferably, current sensors 210 and 212 are absolute current sensors, i.e., they are arranged for measuring the absolute current, whereas it suffices to measure current transients if current sensors 213, 214, or 215, are employed. For measuring current transients, Rogowski coils may, e.g., be used.

It will also be appreciated by those skilled in the art that current measurements may be performed continuously, occasionally, or at regular time intervals. For the purpose of detecting breaker failures according to an embodiment of the present invention, it suffices to perform current measurements when the internal commutation process is expected to take place. In other words, the current measurements may start after the reception of the trip signal, and may be stopped when the internal commutation is completed successfully, or the breaker failure detection device has discovered a breaker failure. However, current measurements may also be performed at any time.

Embodiments of the breaker failure detection unit, such as unit 211, described with reference to FIG. 2, may be based on processing means executing a suitable software, on electronic circuits, or a combination of both. One may also envisage embodiments of the invention which are based on a readily available computer, or an existing control unit of an HVDC system, such as a failure protection unit, executing software which implements the method according to the second aspect of the invention.

The person skilled in the art realizes that the present invention by no means is limited to the embodiments described above. On the contrary, many modifications and variations are possible within the scope of the appended claims. For example, even though the invention has been described in terms of a DC circuit breaker comprising current sensors and a breaker failure detection unit, one may envisage embodiments of the invention designed as an upgrade to existing DC circuit breakers. For instance, one may envisage breaker failure detection devices comprising at least one current sensor and a breaker failure detection unit being designed to fit existing DC circuit breakers. Further, one may also envisage embodiments of the invention comprising currents sensor in addition to a software implementing an embodiment of the second aspect of the invention, which software is suitable for upgrading an existing failure protection unit.

In conclusion, a breaker failure detection device for a DC circuit breaker is provided. The circuit breaker comprises a circuit breaking element and a non-linear resistor, e.g., a surge arrester, connected in parallel. The breaker failure detection device comprises a current sensor, for measuring a current commutating from the circuit breaking element, and a breaker failure detection unit. The breaker failure detection unit is arranged for comparing the measured current to desired values and deciding that an internal commutation process of the circuit breaker does not proceed as desired if the measured current deviates from the desired values. The present invention makes use of an understanding that an improved detection of breaker failures may be achieved by monitoring the internal commutation process of the circuit breaker. Further, a method of breaker failure detection is provided.

The invention claimed is:

1. A breaker failure detection device for a direct current (DC) circuit breaker, the DC circuit breaker comprising:
   a circuit breaking element being arranged for interrupting a DC circuit upon reception of a trip signal, and
   a non-linear resistor being connected in parallel with the circuit breaking element,
   wherein the breaker failure detection device comprises:
   at least one current sensor being arranged for measuring a current commutating from the circuit breaking element, and a breaker failure detection unit configured to:
  compare the measured current to desired values,
  decide, under the condition that the measured current deviates from the desired values, that an internal commutation process of the circuit breaker does not proceed as desired, and
  assess, based on the measured current as a function of time, a cause of the undesired internal commutation process.

2. The breaker failure detection device according to claim 1, wherein the breaker failure detection unit is further configured to decide, under the condition that the measured current deviates from the desired values, that the circuit breaking element has failed in interrupting the DC circuit.

3. The breaker failure detection device according to claim 1, wherein the breaker failure detection unit is further configured to trip, in response to deciding that the internal commutation process does not proceed as desired, a backup circuit breaker.

4. A breaker failure detection device for a direct current (DC) circuit breaker, the DC circuit breaker comprising:
  a circuit breaking element being arranged for interrupting a DC circuit upon reception of a trip signal, and
  a non-linear resistor being connected in parallel with the circuit breaking element,
  wherein the breaker failure detection device comprises:
  at least one current sensor being arranged for measuring a current commutating from the circuit breaking element, and
  a breaker failure detection unit configured to:
    compare the measured current to desired values,
    decide, under the condition that the measured current deviates from the desired values, that an internal commutation process of the circuit breaker does not proceed as desired, and
    re-close, in response to deciding that the internal commutation process does not proceed as desired, the circuit breaking element.

5. A breaker failure detection device for a direct current (DC) circuit breaker, the DC circuit breaker comprising:
  a circuit breaking element being arranged for interrupting a DC circuit upon reception of a trip signal, and
  a non-linear resistor being connected in parallel with the circuit breaking element,
  wherein the breaker failure detection device comprises:
  at least one current sensor being arranged for measuring a current commutating from the circuit breaking element, and
  a breaker failure detection unit configured to
    compare the measured current to desired values,
    decide, under the condition that the measured current deviates from the desired values, that an internal commutation process of the circuit breaker does not proceed as desired,
    estimate, based on the measured current and a counter voltage of the non-linear resistor, the amount of energy to be dissipated by the non-linear resistor, and
    compare the estimated energy to a predetermined value, and decide, under the condition that the estimated energy exceeds the predetermined value, that the non-linear resistor is overloaded.

6. The breaker failure detection device according to claim 5, wherein the breaker failure detection unit is further configured to re-close, in response to deciding that the non-linear resistor is overloaded, the circuit breaking element.

7. A direct current (DC) circuit breaker comprising:
  a circuit breaking element being arranged for interrupting a DC circuit upon reception of a trip signal,
  a non-linear resistor being connected in parallel with the circuit breaking element, and
  a breaker failure detection device according to claim 1.

8. The circuit breaker according to claim 7, wherein the circuit breaker further comprises a resonance circuit being connected parallel with the circuit breaking element.

9. A method of breaker failure detection for a direct current (DC) circuit breaker, the DC circuit breaker comprising:
  a circuit breaking element being arranged for interrupting a DC circuit upon reception of a trip signal, and
  a non-linear resistor being connected in parallel with the circuit breaking element,
  wherein the method comprises:
    measuring a current commutating from the circuit breaking element,
    comparing the measured current to desired values,
    deciding, under the condition that the measured current deviates from the desired values, that an internal commutation process of the circuit breaker does not proceed as desired, and
    assessing, based on the measured current as a function of time, a cause of the undesired internal commutation process.

10. The method according to claim 9, further comprising deciding, under the condition that the internal commutation process does not proceed as desired, that the circuit breaking element has failed.

11. The method according to claim 9, further comprising tripping, in response to deciding that the internal commutation process does not proceed as desired, a backup circuit breaker.

12. A method of breaker failure detection for a direct current (DC) circuit breaker, the DC circuit breaker comprising:
  a circuit breaking element being arranged for interrupting a DC circuit upon reception of a trip signal, and
  a non-linear resistor being connected in parallel with the circuit breaking element,
  wherein the method comprises:
    measuring a current commutating from the circuit breaking element,
    comparing the measured current to desired values,
    deciding, under the condition that the measured current deviates from the desired values, that an internal commutation process of the circuit breaker does not proceed as desired, and
    re-closing, in response to deciding that the internal commutation process does not proceed as desired, the circuit breaking element.

13. A method of breaker failure detection for a direct current (DC) circuit breaker, the DC circuit breaker comprising:
  a circuit breaking element being arranged for interrupting a DC circuit upon reception of a trip signal, and
  a non-linear resistor being connected in parallel with the circuit breaking element,
  wherein the method comprises:
    measuring a current commutating from the circuit breaking element,
    comparing the measured current to desired values,
    deciding, under the condition that the measured current deviates from the desired values, that an internal commutation process of the circuit breaker does not proceed as desired, estimating, based on the measured current and a counter voltage of the non-linear resistor, the amount of energy to be dissipated by the non-linear resistor, and comparing the estimated energy to a predetermined value, and deciding, under the condition that the estimated energy exceeds the predetermined value, that the non-linear resistor is overloaded.

14. The method according to claim 13, further comprising re-closing, in response to deciding that the non-linear resistor is overloaded, the circuit breaking element.

15. A direct current (DC) circuit breaker comprising:
a circuit breaking element being arranged for interrupting a DC circuit upon reception of a trip signal,
a non-linear resistor being connected in parallel with the circuit breaking element, and
a breaker failure detection device according to claim 2.

16. A direct current (DC) circuit breaker comprising:
a circuit breaking element being arranged for interrupting a DC circuit upon reception of a trip signal,
a non-linear resistor being connected in parallel with the circuit breaking element, and
a breaker failure detection device according to claim 3.

17. A direct current (DC) circuit breaker comprising:
a circuit breaking element being arranged for interrupting a DC circuit upon reception of a trip signal,
a non-linear resistor being connected in parallel with the circuit breaking element, and
a breaker failure detection device according to claim 4.

18. A direct current (DC) circuit breaker comprising:
a circuit breaking element being arranged for interrupting a DC circuit upon reception of a trip signal,
a non-linear resistor being connected in parallel with the circuit breaking element, and
a breaker failure detection device according to claim 5.

19. A direct current (DC) circuit breaker comprising:
a circuit breaking element being arranged for interrupting a DC circuit upon reception of a trip signal,
a non-linear resistor being connected in parallel with the circuit breaking element, and
a breaker failure detection device according to claim 6.

20. The breaker failure detection device according to claim 1, wherein the breaker failure detection unit assesses the cause of the undesired internal commutation process, thereby identifying a failing part of the circuit breaking element.

21. The method according to claim 13, wherein the step of assessing the cause of the undesired internal commutation process includes identifying a failing part of the circuit breaking element.

* * * * *